(12) United States Patent
Costinel

(10) Patent No.: US 7,014,756 B2
(45) Date of Patent: Mar. 21, 2006

(54) METHOD AND APPARATUS FOR SEPARATING IMMISCIBLE PHASES WITH DIFFERENT DENSITIES

(75) Inventor: Paul Costinel, Edmonton (CA)

(73) Assignee: Genoil Inc., Sherwood Park (CA)

( * ) Notice: Subject to any disclaimer, the term of this patent is extended or adjusted under 35 U.S.C. 154(b) by 114 days.

(21) Appl. No.: 10/826,385

(22) Filed: Apr. 19, 2004

(65) Prior Publication Data

US 2005/0173337 A1    Aug. 11, 2005

Related U.S. Application Data

(60) Provisional application No. 60/463,786, filed on Apr. 18, 2003.

(51) Int. Cl.
*B01D 17/02* (2006.01)

(52) U.S. Cl. .................. 210/180; 210/187; 210/512.1; 210/519; 210/521; 210/532.1; 210/539; 210/540; 210/DIG. 5; 96/216

(58) Field of Classification Search ................ 210/180, 210/187, 512.1, 519, 521, 532.1, 538, 539, 210/540, DIG. 5; 96/216
See application file for complete search history.

(56) References Cited

U.S. PATENT DOCUMENTS

| | | | | |
|---|---|---|---|---|
| 2,179,131 | A | * | 11/1939 | Millard ........................ 210/180 |
| RE27,210 | E | * | 11/1971 | McMinn et al. ............ 210/180 |
| 4,678,588 | A | * | 7/1987 | Shortt ....................... 210/512.1 |
| 5,252,229 | A | * | 10/1993 | Rojey et al. .............. 210/512.1 |
| 5,326,474 | A | * | 7/1994 | Adams et al. ............... 210/521 |
| 5,570,744 | A | * | 11/1996 | Weingarten et al. ...... 210/512.1 |
| 5,840,198 | A | * | 11/1998 | Clarke ......................... 210/519 |
| 5,972,215 | A | * | 10/1999 | Kammel ................. 210/DIG. 5 |
| 6,315,131 | B1 | * | 11/2001 | Terrien et al. .............. 210/519 |
| 6,666,338 | B1 | * | 12/2003 | Henriksson et al. ...... 210/512.1 |
| 6,755,978 | B1 | * | 6/2004 | Oddie ......................... 210/540 |
| 2001/0025813 | A1 | * | 10/2001 | Lingelem ................. 210/512.1 |

* cited by examiner

*Primary Examiner*—Christopher Upton
(74) *Attorney, Agent, or Firm*—Oyen Wiggs Green & Mutala LLP

(57) ABSTRACT

An apparatus for separating a mixture of a less dense fluid, a more dense fluid, and fines. The less and more dense fluids are immiscible with each other. The apparatus comprises a housing having an inlet at an upstream end thereof and an outlet at a downstream end thereof. A separation chamber is located within the housing between the inlet and the outlet. The separation chamber comprises a generally horizontal enclosure and a screw defining a helical passage through the enclosure. The separation chamber has at least one upper aperture located in an upper portion of the helical passage and at least one lower aperture located in a lower portion of the helical passage. A baffle is attached between the housing and the separation chamber for directing at least a portion of the mixture into the separation chamber. As the mixture is directed through the helical passage at least a portion of the less dense fluid passes through the upper aperture into an upper collection zone in the housing, and at least a portion of the fines passes through the lower aperture into a lower collection zone in the housing.

19 Claims, 6 Drawing Sheets

METHOD AND APPARATUS FOR SEPARATING IMMISCIBLE PHASES WITH DIFFERENT DENSITIES

REFERENCE TO RELATED APPLICATION

This application claims the benefit under 35 U.S.C. §119 of U.S. patent application No. 60/463,786, filed Apr. 18, 2003 entitled "METHOD AND APPARATUS FOR SEPARATING FOUR IMMISCIBLE PHASES WITH DIFFERENT DENSITIES", which is incorporated herein by reference.

TECHNICAL FIELD

The invention relates to methods and apparatus for separating immiscible phases having different densities. Embodiments of the invention have application in the oil industry. The invention has application in separating materials such as oil, natural gas, water and solids, such as sand.

BACKGROUND

In the oil industry it is often necessary to separate oil from water and other materials. For example, oil from an oil well may be mixed with water and may have entrained in it gases, such as natural gas and/or solids, such as sand. It is necessary to separate these phases. Separators are used for this purpose. Some such separators are known as "free water knockout devices". Such separators typically rely merely on the force of gravity for separation. Gravity separators can be either vertical or horizontal in configuration.

In vertical skimmers, oil droplets rise upward countercurrent to the downward flow of water. In horizontal separators oil droplets rise perpendicular to the flow of water. Horizontal separators tend to be more efficient at treating water because the oil droplets do not have to flow countercurrent to the flow of water. However, horizontal vessels often cannot handle effectively gas surges or deposits of sand and other solid particles.

To increase the ability of separators to handle small particles of oil, it is typical to heat the fluid being treated to elevated temperatures. Heating the fluid lowers its viscosity and enhances separation. Due to large flow rates a significant amount of energy is required to heat the fluid. Providing this heat energy is expensive, especially at times when energy prices are high. Furthermore, the pre-heaters used to heat fluids for separation have a significant capital cost and require frequent maintenance and repairs.

In order to improve separation efficiency, prior art devices are made to provide increased residence time. This inevitably increases their sizes and construction costs.

The high content of oil in the effluent is another important disadvantage of existing free water knockout devices. A certain amount of oil contained in the effluent is carried away when the effluent is re-circulated to the well. Over time, such oil losses can be far from negligible.

Furthermore, oil pumped back into the well tends to accumulate in the ground, gradually obstructing the passage of water utilized for oil extraction. As a result, the well could be plugged and put out of service prematurely with significant losses.

Additionally, inadequate separation of water and solids from oil may result in the oil failing to meet specifications for transporting the oil in a pipeline.

Various methods for enhancing separation by means of plate coalescers have been devised. Prior art coalescers are commonly called parallel plate interceptors (PPI) corrugated plate interceptors (CPI), or cross flow separators. In PPI's, sediments migrate inwardly and downwardly to the bottom of the separator where they are removed. Because of the design of the PPI's the collection of sediments is inadequate resulting in frequent plugging of the device.

CPI's have parallel plates which are corrugated with the direction of the corrugations parallel to the direction of the flow. The plate pack is inclined at an angle of 45° to allow both oil and sand to separate. Experience has shown that oily wet sand may adhere to a 45° slope clogging the plates. In addition, the sand collection channels cause turbulence and are themselves subject to plugging.

In cross-flow devices liquid flows perpendicular to the direction of the corrugations in the plates. This allows the plates to be held at a steeper angle to facilitate sediment removal. However, in typical cross flow devices the plates are held within a cylindrical tank. In such devices the sediment collection zone is inadequate and the length of the plates is limited by the diameter of the tank.

Despite the various kinds of separators available, there is a need in the oil industry for cost effective separation devices which are capable of separating phases such as oil, gas, solids and water.

BRIEF DESCRIPTION OF THE DRAWINGS

In drawings which illustrate apparatus and methods according to non-limiting embodiments of the invention.

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
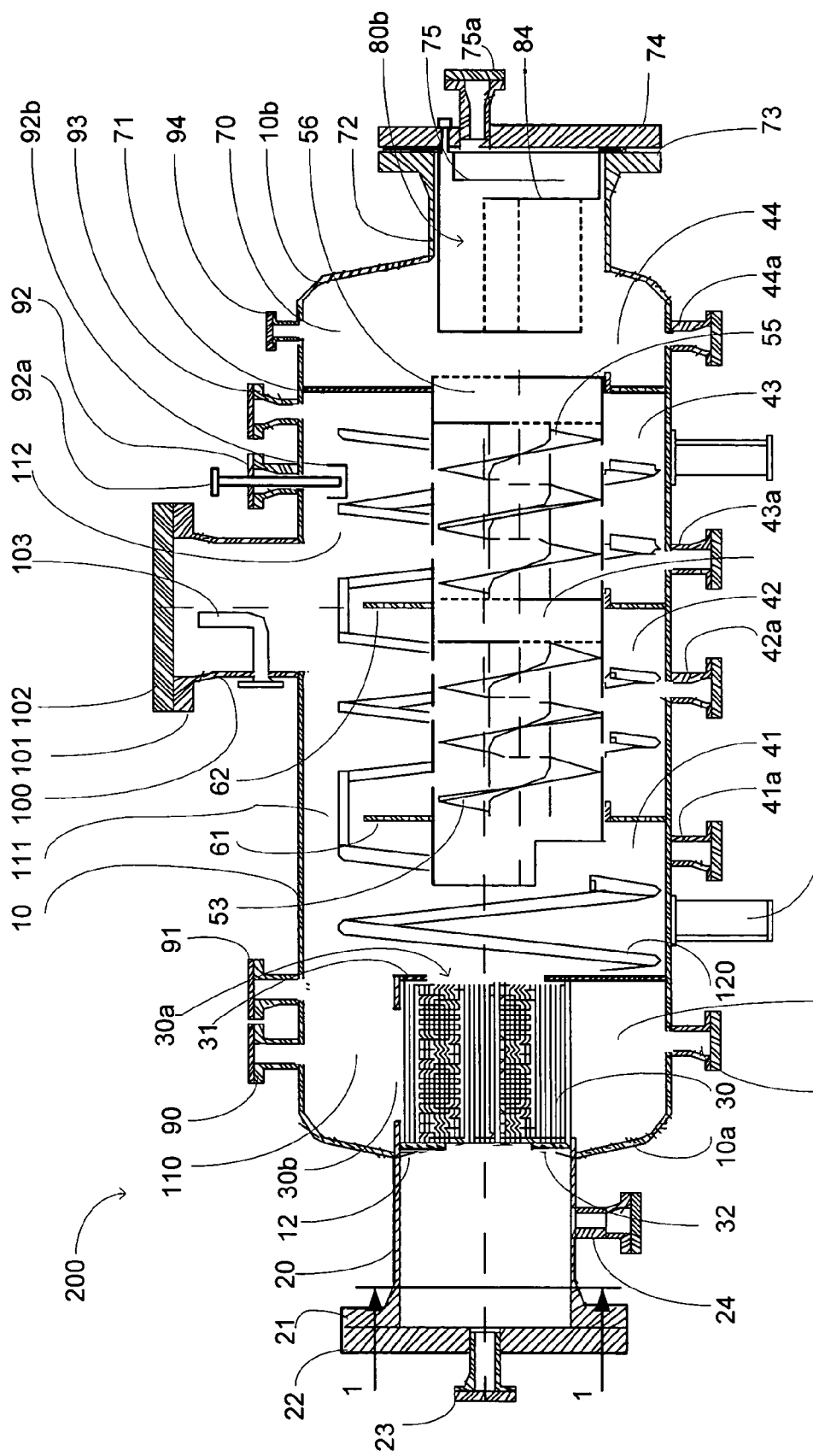
FIG. 1 is an elevational section through an apparatus according to one embodiment of the invention.

FIG. 1 shows an apparatus 200 for separating a mixture of a less dense fluid such as oil, a more dense fluid such as water, solids and possibly gas according to a specific embodiment of the invention.

Apparatus 200 has a number of inventive features which may be combined as in apparatus 200 or may be implemented separately. While these features are implemented in a specific manner in apparatus 200 they may also be implemented in other functionally equivalent manners without departing from the invention. The methods of the invention are described herein in the context of the operation of apparatus 200 being used for separating oil from water, gas and solids phases. The methods of the invention may also be practiced using apparatus which differs in details of construction from apparatus 200.

Apparatus 200 comprises a vessel 10. In the illustrated embodiment, vessel 10 is cylindrical and is supported horizontally on legs 11. Domed end plates 10a and 10b close either end of vessel 10. A mixture of fluids and solids to be separated is passed through vessel 10 in a direction from end plate 10a to end plate 10b. Throughout the following description, the direction from end plate 10b to end plate 10a is referred to as "forward", and the direction from end plate 10a to end plate 10b is referred to as "rearward".

Plate 10a has a centrally located aperture 12. Aperture 12 provides fluid communication between vessel 10 and distribution chamber 20. Distribution chamber 20 is defined by a cylindrical housing projecting from vessel 10. Distribution chamber 20 is closed by a lid 22 which is bolted to a flange 21. A coalescing plates pack 30 is located in aperture 12. Plates pack 30 comprises a number of corrugated plates. An aperture located above plates pack 30 permits oil and gas retained by plates pack 30 to rise into a collection zone 110. The aperture is a rectangular slot 30b in the illustrated embodiment.

The lower portion of distribution chamber 20 is cut out below plates pack 30 to allow solids to fall freely into collection zone 40. Sediments may be evacuated from space 40 through a drain line 40a which can be connected to a vacuum truck. This may be done periodically. A conduit 24 in a lower portion of distribution chamber 20 provides a way to drain distribution chamber 20 when required.

A fluid comprising a mixture of phases to be separated can be introduced into distribution chamber 20 by way of an inlet line 23. Distribution chamber 20 ensures even distribution of the fluid (which includes a mixture of phases) through plates pack 30 and significantly reduces the velocity of the fluid entering the apparatus from inlet line 23.

Figure 2:
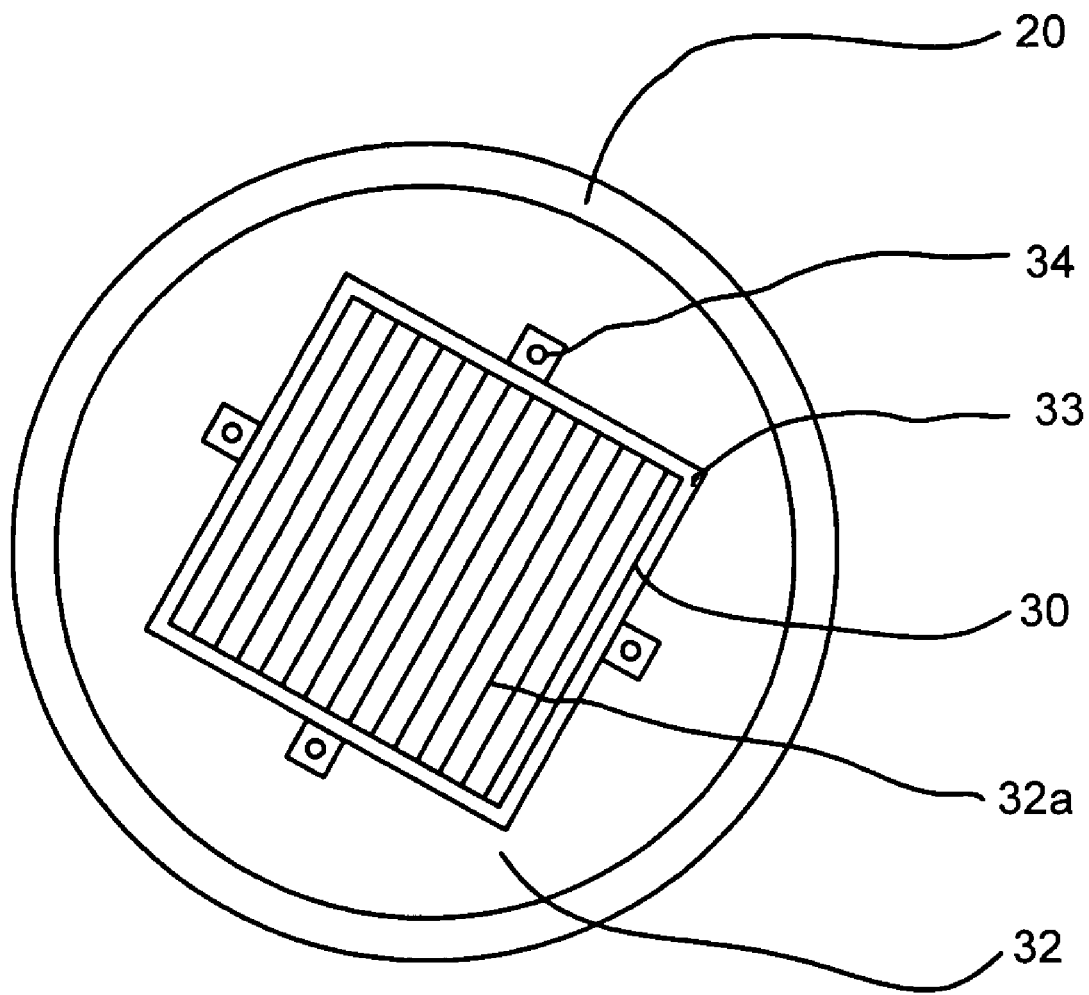
FIG. 2 is a sectional view along line 1—1 showing a plates pack of the apparatus of FIG. 1.

As shown in FIGS. 1 and 2, a circular plate 32 affixed to the inner walls of the distribution chamber 20 in the way of aperture 12 partially closes distribution chamber 20. Plate 32 has a square-shaped opening 32a whose vertical axis is rotated by 30° from the horizontal. The rotation is counter-clockwise in the illustrated embodiment. Plate 32 supports the fore end of plates pack 30 and directs the fluid entering distribution chamber 20 into plates pack 30.

A baffle plate 31, which can be generally circular in shape is affixed to the aft end of distribution chamber 20. Baffle plate 31 partially encloses the front end of vessel 10. A lower portion of baffle 31 forms space 40 in conjunction with the walls of vessel 10. An upper portion of baffle 31 deflects oil and gas separated within plates pack 30 towards an oil collection zone 110 of vessel 10 for further separation.

Baffle plate 31 has a square-shaped aperture 30a situated in its mid-section. Aperture 30a is rotated clockwise by 30° from the horizontal. Aperture 30a is suitably sized to accommodate the aft end of plates pack 30.

Plates pack 30 is held together by a cage 33 which is secured to circular plate 32 by means of brackets 34, as shown in FIG. 2. The plates of plates pack 30 are preferably equally spaced apart. Plates pack 30 directs oil and solids to collection zones 110 and 40 respectively. As the mixture of oil, water and solids is separated by apparatus 200, an oil pad forms in an upper region of vessel 10 comprising oil collection zones 110, 111 and 112. Plates pack 30 is situated in the space between circular plate 32 and baffle plate 31. A fore end of plates pack 30 is supported by circular plate 32 and an aft end of plates pack 30 is supported by baffle plate 31.

In this embodiment, the corrugated plates of plates pack 30 are inclined at 60° to the horizontal. This facilitates the migration of solids to collection zone 40 and prevents undue deposits from accumulating on the surface of the corrugated plates. At the same time, the steep angle of inclination ensures effective migration of any oil retained by the plates toward oil collection zone 110. The corrugations of plates pack 30 are oriented so that they cross the direction of flow of fluid through plates pack 30. This reduces the impact of gas surges and creates a quiet zone that assists separation.

Figure 3:
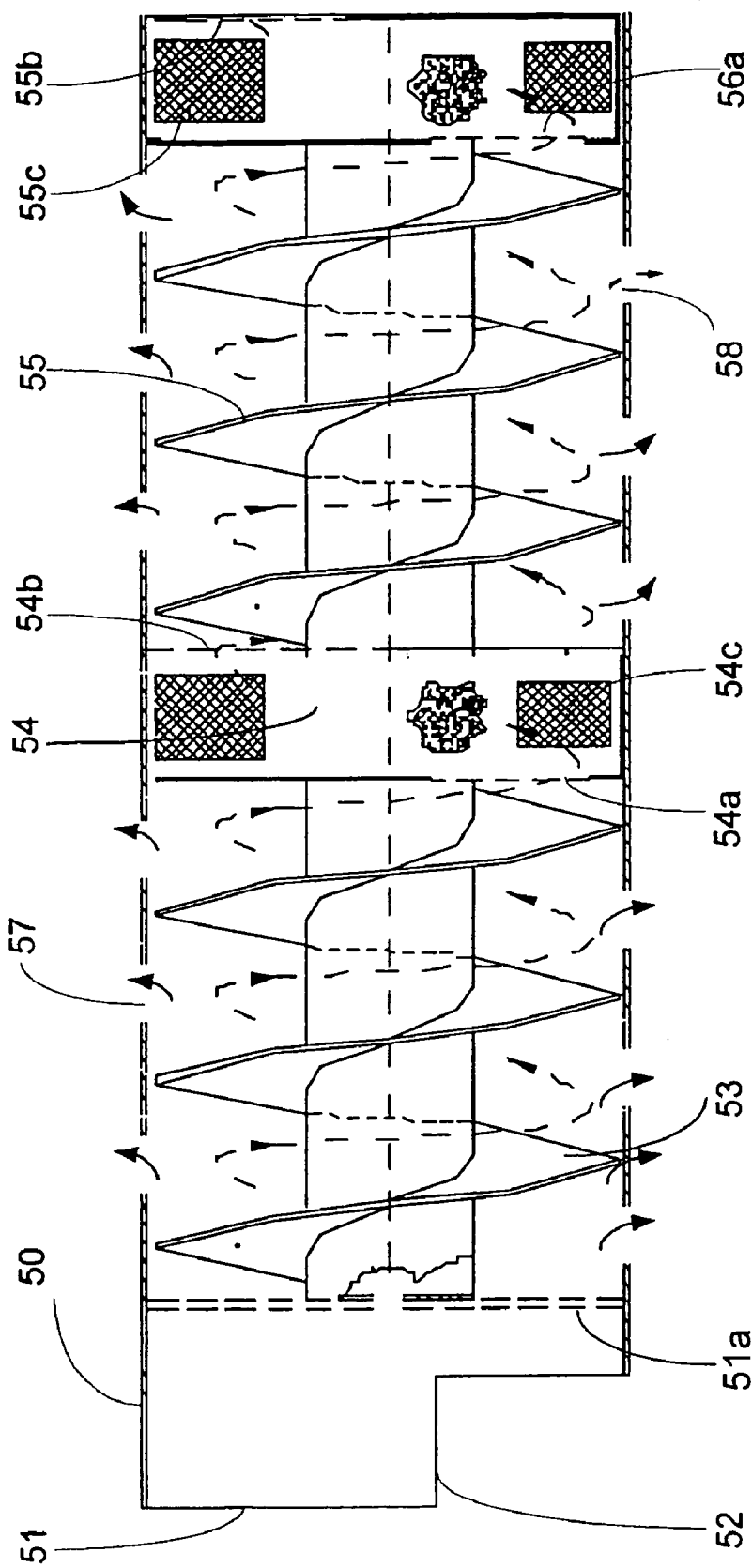
FIG. 3 is an elevational section through the fine-separation chamber of the apparatus of FIG. 1.

As shown best in FIG. 3, vessel 10 comprises a fine separation stage designed for fine separation. The fine separation stage is housed within a generally cylindrical fine separation chamber 50 and is placed eccentrically to the axis of vessel 10. Chamber 50 of fine separation stage is supported by baffle 61, baffle 62, and baffle 71.

Baffles 61 and 62 are generally circular plates. The upper portions of baffles 61 and 62 are cut out. Baffles 61 and 62 are affixed to the inner walls of vessel 10. Openings are provided between the upper edges of baffles 61 and 62 and the upper section of vessel 10. Baffles 61 and 62 have generally circular apertures therein to permit chamber 50 to pass therethrough. The axis of the apertures of baffles 61 and 62 are situated eccentrically to the longitudinal axis of vessel 10. Baffles 61 and 62 direct fluid to flow primarily through fine-separation chamber 50. In use, an oil pad forms above baffles 61 and 62. The oil pad blocks the passage of water over the edges of baffles 61 and 62.

The fore end of chamber 50 is partially enclosed by a plate 51. Housing 50 is in fluid communication with the lower section 41 of vessel 10 through an aperture (rectangular opening 52) at the lower side of housing 50. A perforated plate 51a distributes the flow to a screw 53 situated between plate 51a and a coalescing chamber 54.

Screw 53 causes fluid flowing through housing 50 to flow in a helical path. As fluid travels along screw 53, it ascends and descends several times leaving behind oil droplets when it reaches upper portions of screw 53 and fine sediments at the lower portions of screw 53. Apertures comprising upper and lower slots 57 and 58 located in the upper and lower parts of housing 50, respectively, between the flights of screw 53 permit oil and sediments to exit from housing 50. Upper slots 57 release oil reclaimed from the fluid into oil collection zones 111 and 112. Lower slots 58 discharge fines removed from the fluid into collection zones 42 and 43.

At the end of screw 53 is a first coalescing chamber 54, which is defined between plates 54a and 54b. Plates 54a and 54b may be affixed to the inner wall of housing 50 forming a generally cylindrical coalescing chamber 54. Plate 54a is perforated at its lower portion whereas plate 54b is perforated at its upper section. Coalescing chamber 54 is in part filled through meshed openings 54c with free-floating oleophilic beads which are less dense than water. Meshed openings 54c may be covered once the beads have been inserted into coalescing chamber 54. The flow of liquid is directed by screw 53 to the lower portion of coalescing chamber 54 through the perforations in plate 54a. Upon entering coalescing chamber 54, the fluid travels upwards between the oleophilic beads, which attract small oil droplets through surface tension forces. The fluid leaves coalescing chamber 54 through the perforations of plate 54b, which are sized to retain the beads in chamber 54. Oil is retained by the beads in the form of droplets which are released when the buoyancy of the droplets exceeds the forces of attraction exerted by the beads on the droplets. Released oil droplets are discharged into oil collection zone 112 through apertures 57.

Fluid which has passed out of coalescing chamber 54 through the perforations in plate 54b passes into a portion of housing 50 which contains a second screw 55. Screw 55 may be constructed similarly to screw 53 and is located within housing 50 between coalescing chamber 54 and a second coalescing chamber 56.

Coalescing chamber 56 is situated at the aft end of screw 55 and may be constructed in substantially the same manner as coalescing chamber 54. Coalescing chamber 56 further retains oil droplets that have passed through coalescing chamber 54. Coalescing chamber 56 is defined between plates 56a and 56b. Plate 56b has an upper perforated section which provides fluid communication between chamber 56 and a polishing chamber 70.

Small amounts of oil which coalesce within chamber 56 are released into the upper portion of polishing chamber 70 from where they can be evacuated through conduit 94.

Baffles 61 and 62 divide vessel 10 into three oil collection zones 110, 111 and 112. Oil retained in collection zone 110 migrates over the edge of baffle 61 leaving behind small water droplets. Oil then travels to collection zone 111 and from there, to collection zone 112 becoming gradually drier.

A heating coil 120, which may have a helical form, surrounds chamber 50 along its length. Coil 120 heats the oil accumulated in the upper portion of vessel 10 and thereby lowers the viscosity of the oil. Heating coil 120 assists in the removal of water and solids from the accumulated oil. Because heating coil 120 is placed away from fine separation chamber 50, and baffles 61 and 62 direct the flow into fine-separation chamber 50, heat is not transferred directly to the liquid processed within chamber 50. Thus, most of the liquid in chamber 50 is heated only indirectly.

A plurality of ports 90, 91, 92 and 93, which may comprise flanged conduits and may be similar to one another are provided in the upper portion of vessel 10. Ports 90, 91, 92 and 93 accommodate instrumentation and controls.

Oil accumulated at the upper portion of vessel 10 may be evacuated periodically through a conduit 92a which extends towards the edge of baffle 62. Conduit 92a is surrounded by cup 92b designed to create a smooth flow in order to prevent water from being entrained into conduit 92a.

Gas cylinder 100 extends upwardly from the upper section of vessel 10. Gas cylinder 100 is made gas tight by a lid 102 bolted to a flange 101. Gas cylinder 100 provides space for the accumulation of gas in vessel 10 and diminishes the effect of gas surges.

Gas travels through the upper portion of vessel 10 to gas cylinder 100 from where it can be evacuated continually through conduit 103 which extends upwards well above the level of the liquid in order to minimize the risk of accidental entrainment of liquid into conduit 103. Gas cylinder 100 may comprise a gas level sensor which monitors the level of the interface between the accumulated gas and the oil pad.

Situated at the lower part of vessel 10 are drain conduits 41a, 42a and 43a. These drain conduits may be used to evacuate fines collected at the bottom of vessel 10.

Figure 4:
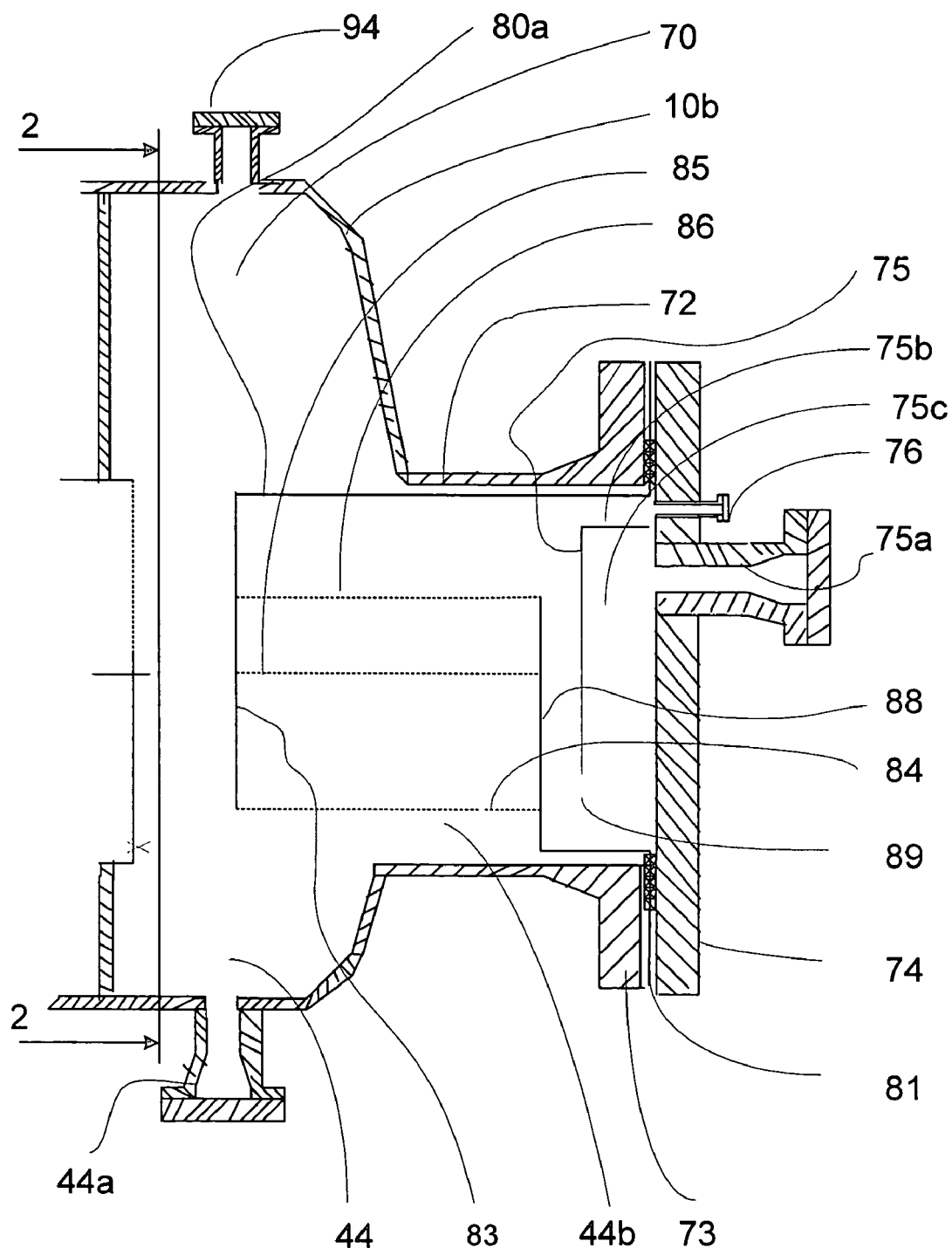
FIG. 4 is an elevational section showing the polishing chamber of the apparatus of FIG. 1.
Figure 5:
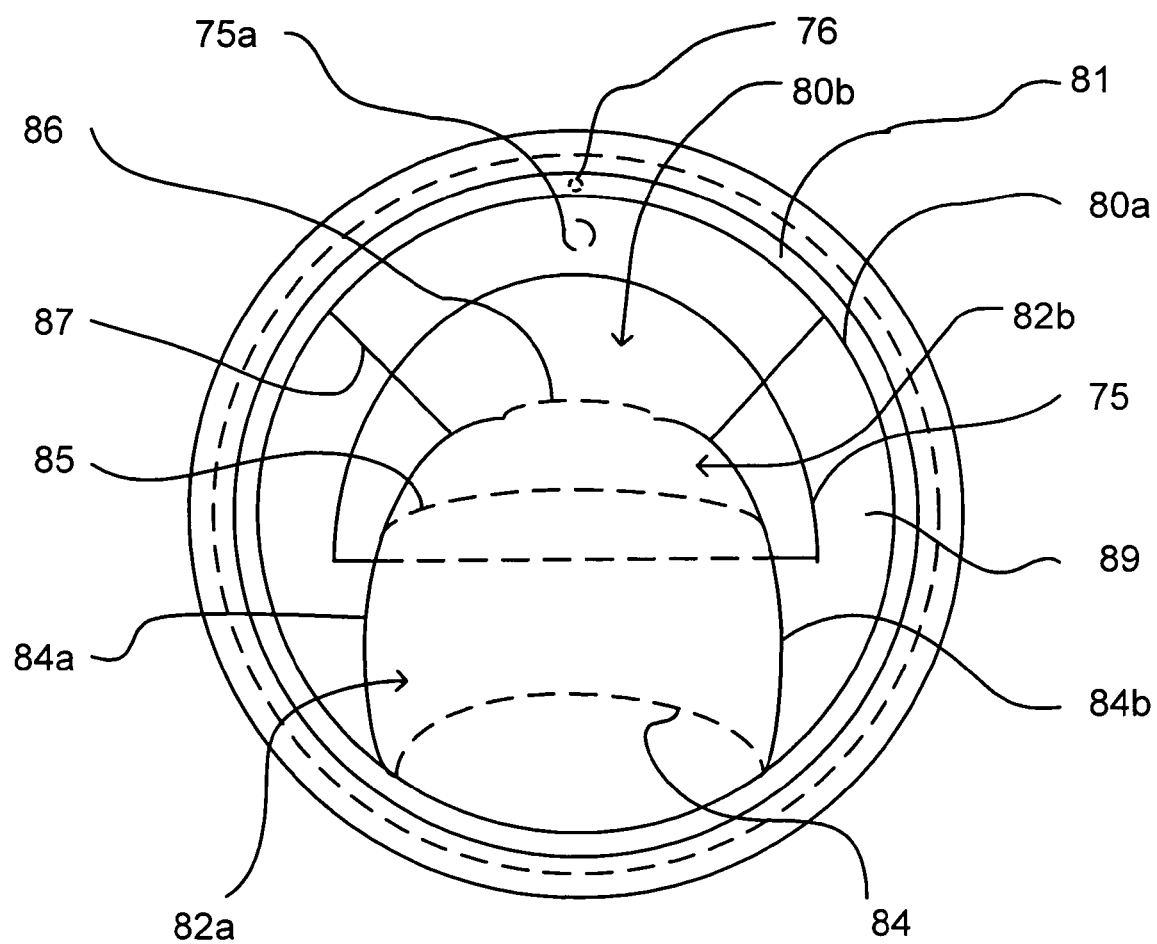
FIG. 5 is a sectional view along line 2—2 of the polishing device of FIG. 4.

Polishing chamber 70 is best shown in FIGS. 1, 4 and 5. Polishing chamber 70 is defined between a baffle 71 and end plate 10b. Baffle 71 comprises a circular plate affixed around its circumference to the inner walls of vessel 10. Baffle 71 separates polishing chamber 70 from oil collection zone 112.

Plate 10b has a generally circular aperture made concentrically with the axis of fine separation chamber 50. Cylinder 72 is affixed to dome-shaped plate 10b and comprises flange 73 and lid 74 bolted to said flange in order to make polishing chamber 70 watertight. Polishing chamber 70 provides access to housing 50. When lid 74 is removed, housing 50 can slide through the apertures of baffle 61, baffle 62 and plate 10b in order to be removed periodically for inspection.

At the upper section of polishing chamber 70 is an orifice connected to conduit 94. Any small amounts of oil reaching polishing chamber 70 may be withdrawn through conduit 94 by opening a purge valve (not shown).

Polishing chamber 70 houses polishing device 80 designed to polish the water prior to discharging said water through outlet conduit 75a. Referring to FIG. 4 and FIG. 5, polishing device 80 includes cylinder 80a, which is partially enclosed at one end by a plate 83 affixed to cylinder 80a. The aft end of cylinder 80a is affixed to flange 81 and is open. Cylinder 80a is placed within cylinder 72 with flange 81 pressed against flange 73 of cylinder 72 by means of lid 74. The aft end of polishing chamber 70 is therefore enclosed by lid 74, which provides an exit to the liquid processed within said polishing device. Lid 74 comprises an orifice connected to outlet line 76. On the inner side of lid 74 is an arrangement devised to reduce turbulence and therefore undue entrainment of oil reclaimed by polishing device 80. Semi-cylindrical plate 75b affixed to plate 75 forms chamber 75c with a rectangular opening at its lower part.

The lower portion of cylinder 80a is cut out to form an aperture, which may be rectangular, for the admission of liquid into polishing stage 80. Referring to FIG. 4 and FIG. 5, plate 84a, plate 84b and perforated plate 86 are affixed together and to plate 84 and are suitably curved to form coalescing chamber 82. Stiffeners 87 affixed to plates 84a and 84b provide support to coalescing chamber 82 as the pressure drop through the fine coalescing beads could otherwise tend to unduly distort chamber 82.

Circular plate 83 affixed to cylinder 80a encloses one side of coalescing chamber 82. The other side of coalescing chamber 82 is enclosed by plate 88, which extends downwards. The lower portion of plate 88 is affixed to cylinder 80a in order to separate coalescing chamber 82 from the outlet portion 89 of polishing device 80 and direct the incoming flow from section 44 to coalescing chamber 82.

Perforated plate 84 encloses coalescing chamber 82 at the lower portion of chamber 82. Perforated plate 85 divides coalescing chamber 82 into two coalescing zones 82a and 82b filled with fine and coarse oleophilic beads, respectively. The orifices of perforated plate 84, perforated plate 85 and perforated plate 86 are suitably sized to retain the beads within coalescing chamber 82.

Coalescing zone 82a is filled with very small beads designed to impede the passage of minute oil droplets that could not be retained by fine-separation cylinder 50. Coalescing zone 82b contains larger diameter beads, which process oil droplets released by coalescing zone 82a. Larger oil droplets formed in coalescing area 82b migrate upwards where they are retained in collection zone 80b on the underside of cylinder 80a for periodic evacuation through conduit 76.

Figure 6:
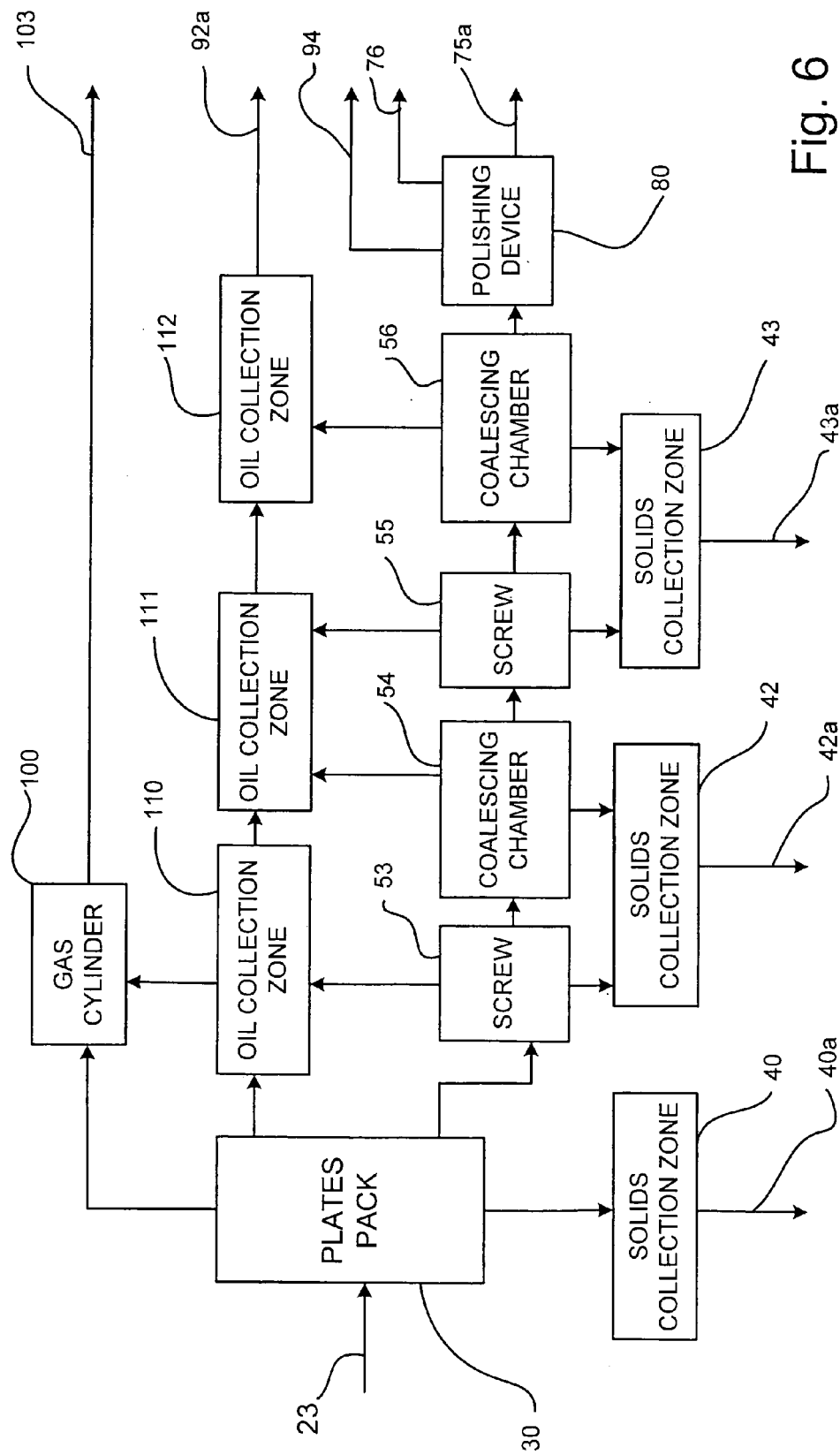
FIG. 6 is a block diagram illustrating a separation process achieved in several steps according to another embodiment of the invention.

Referring to FIG. 1 and FIG. 6, vessel 10 is initially filled with water to above the upper edge of baffle 61. A gas cushion trapped in the upper section of vessel 10 creates a certain pressure within vessel 10. Mixture pumped to vessel 10 through inlet line 23 enters distribution chamber 20. The relatively large space of distribution chamber 20 reduces suddenly the velocity of the fluid which is directed into plates pack 30 for preliminary separation. Rising oil droplets rise and reach the underside of a corrugated plate where they tend to agglomerate. The inclination of the plate facilitates the migration of the oil droplets towards the upper edge of the plate. As adjacent oil droplets come in contact, they coalesce forming a larger droplet with enhanced buoyancy and tendency to leave the plates of plates pack 30. After being released from plates pack 30, the oil droplets travel toward oil collection area 110.

Because the flow is directed along the entire length of plates pack 30, the path of the fluid is prolonged which increases the probability of contact between oil droplets and the plates of plates pack 30. Furthermore, the fluid flowing over the corrugations has a sweeping effect over the surfaces of plates pack 30, which facilitates removal of accumulated oil from the plates.

Solids descend being retained by nearby corrugated plates of plates pack 30 and thus removed from the fluid. The steep angle of inclination combined with erosion by the flow of liquid prevents the formation of deposits. After removal from the fluid stream, solids migrate towards the designated collection area 40 where they accumulate over a certain period. Ample space below plates pack 30 accommodates accumulated solids which can be evacuated periodically.

Gas enters distribution chamber 20 as bubbles of various sizes, which travel through plates pack 30 similarly to the oil droplets. Larger bubbles have an erosive impact on oil drops and solids adhering to plates thus preventing deposits. Small gas bubbles collide and attach themselves to oil droplets. Even very small bubbles have sufficient buoyancy for lifting oil droplets and thus removing said droplets from the liquid stream.

Intersecting the axis of flow, the corrugations tend to impede the flow and reduce the impact of the gas surges creating a quiet zone that assists separation. Gas accumulates in gas cylinder 100 and in the upper portion of vessel 10 forming a cushion above the oil pad. The accumulation of gas is monitored by a pressure transmitter (not shown) which may, for example, be mounted on conduit 90. A signal from the pressure transmitter controls, either directly or indirectly, the position of a valve (not shown) installed on conduit 103. The pressure transmitter actuates the valve in such fashion that the amount of gas released through conduit 103 by the valve is equal to the amount of gas entering vessel 10, thus pressure in vessel 10 is maintained relatively constant.

It should be appreciated that the separation arrangement is designed to tackle the problems posed by prior art devices because it ensures effective migration of oil and solids towards the collection zones, provides optimal conditions for separation and ample space for the collection of the separated phases.

Liquid exiting plates pack 30 moves downwards toward the lower portion 41 of vessel 10 and enters fine-separation chamber 50 through aperture 52. The fluid subsequently flows in a helical pattern around screw 53. The helical path followed by the fluid solves the problem posed by horizontal and respectively vertical separators. Thus, oil no longer intersects the horizontal flow of water and can be recovered at the end of the ascending movement of the liquid trough the screw. Rather than rising counter-current to the downward flow of water for separation, fine oil droplets are entrained by the helical flow towards the upper portion of fine-separation chamber 50 where they are released through apertures 57.

Furthermore, liquid flowing along the surface of screw 53 impinges upon the surface of screw 53. This fluid impingement facilitates contact between oil droplets and the surface of screw 53. As a result, small oil droplets cling to screw 53 and are removed from the stream. Coalescence between adjacent oil droplets causes formation of larger droplets, which are then entrained by the flow and left in the vicinity of apertures 57 for migration to oil collection zone 111.

Fines that could not be retained in collection zone 40 are removed at the bottom of screw nearby slots 58 which then discharge fines into collection zone 42.

The flow is then directed to the lower portion of coalescing chamber 54 entering said chamber through the perforations of plate 54a. Water flowing upwards agitates the free-moving beads enhancing both the coalescing effect and the self-cleaning process of the beads. As a result, oil droplets adhering to adjacent beads are readily brought together, forming larger drops that overcome the force of attraction exerted by the beads. Furthermore, the rubbing action occurring between the beads assist the release of oil droplets from the beads. Oil droplets thus removed from the stream migrate upwards being released through the perforation of plate 54b into the upper portion of fine-separation chamber 50. Nearby slots 57 allow the oil droplets to migrate into oil collection zone 112 and join the oil pad accumulated in vessel 10.

The process of fine separation described above is repeated within screw 55 and coalescing chamber 56, with oil and solids being directed to oil and solids collection zones 112 and 43, respectively.

Water containing minute amounts of oil enters polishing chamber 70 through the upper perforated section of plate 56b of coalescing chamber 56. Some oil droplets coalesced in chamber 56 migrate into polishing chamber 70 and rise towards the upper section of polishing chamber 70 from where they can be removed via conduit 94.

The flow is diverted towards the lower section of polishing device 80 and enters said device for final separation. Remaining fines are deposited in area 44 at the lower part of coalescing chamber 82. Coalescing zone 82a achieves removal of minute droplets of oil. In coalescing zone 82a, oil droplets flow through fine coalescing beads designed to significantly hinder the passage of oil droplets. The beads are electro-statically charged to enhance the attraction of oil particles by said beads. The force of attraction exerted by the beads retains minute oil particles within the coalescing zone 82a. A process of gradual coalescence taking place in zone 82a forms a film of oil at the upper section of said zone in the vicinity of perforated plate 85. The flow of water exiting zone 82a through plate 85 shears off the oil film and larger oil droplets reach coalescing zone 82b where they are subject to further coalescence by the coarse beads moving freely in said zone.

Water containing relatively large oil droplets resulting from zone 82b flows upwards and exits coalescing chamber 82 through screen 86. A crescent-shaped space extends along and above coalescing chamber 82. Upon exiting coalescing chamber 82, water travels upwards assisting the migration of oil drops to collection zone 80b. Oil in collection zone 80b exits apparatus 200 by means of conduit 76. The crescent shaped space above coalescing chamber 82 curves the path of the water and the flow is diverted smoothly downwards in a fashion that prevents the formation of undue eddies that could entrain oil droplets into the effluent.

The design of the polishing device 80 ensures that the cross sectional area of the open space in the way of perforated stiffeners 87 is greater than the cross sectional area of perforated plate 86. As a result, the velocity of water leaving coalescing chamber 82 is greater than the velocity of the water moving downwards in the vicinity of stiffeners 87. The flow of water towards the outlet 75a is therefore achieved with minimal probability of carry over of oil droplets. As shown above, the curved surface of the coalescing chamber 82 virtually eliminates eddies and thus further prevents undue contamination of the effluent.

Furthermore, the novel design of the exit space causes acceleration of the liquid flow towards the corners of the exit space at considerable distance from the oil droplets exiting coalescing chamber 82. Thus, the oil droplets are able to move upwards in the mid section of the crescent, or moon-shaped, exit space without interference by the downward flow of water. Virtually oil-free water enters chamber 75c and then exits polishing chamber 80 through outlet line 75a. Oil separated within corrugated plates pack 30 enters collection zone 110 forming a pad. The upper section of the oil pad floats above the water contained within vessel 10 and migrates toward baffle 61. Oil passes over the edge of baffle 61 and then over baffle 62 spreading uniformly throughout oil collection zones 111 and 112 being rendered drier and cleaner. This is due to the fact that water droplets contained in the oil pad find it difficult to overcome gravity and follow the oil in an upwardly movement as the oil passes over the edges of baffles 61 and 62.

Oil reclaimed within fine-separation chamber 50 escapes through slots 57 and joins the oil pad in oil collection zone 111 and zone 112. Because the oil pad is separated from the flow of water by the walls of fine-separation chamber 50, oil droplets that need more time to be absorbed by the oil pad are not carried over towards the exit.

Apparatus 200 may be operated automatically using any suitable control system. Such control systems are well known to those skilled in the art and will not be described here in detail. The following explains briefly the operation of a possible control system for apparatus 200. Oil accumulated in the collection zones is monitored by means of an oil probe (not shown) which may be a conductivity-type oil sensor. The oil probe may be installed in conduit 93. As the oil-water interface moves downwards, the oil probe initiates an oil discharge sequence at a preset level. A valve (not shown) which may be mounted on conduit 92 is then opened automatically and oil is evacuated through the valve. This causes the oil-water interface to move upwards. When the oil probe detects that the oil water interface has dropped to a higher threshold level, the oil discharge sequence is stopped by closing the valve.

Liquid level in vessel 10 is preferably monitored by a level sensor (not shown). The level sensor may be mounted on conduit 90 to monitor the interface between the oil pad and the water, and provides a signal to activate another valve downstream in conduit 75a when the level of this interface exceeds or drops below preset levels.

Apparatus according to the invention may be made using any suitable construction techniques. For example, parts may be affixed to one another by welding, bolting, riveting, or other suitable techniques applicable to the materials used being. The choice of construction techniques and the choices of materials used in making apparatus according to the inventions disclosed herein are matters of design convenience.

Where a component (e.g. a component, assembly, device, circuit, etc.) is referred to above, unless otherwise indicated, reference to that component (including a reference to a "means") should be interpreted as including, as equivalents of that component, any component which performs the function of the described component (i.e., that is functionally equivalent), including components which are not structurally equivalent to the disclosed structure which performs the function in the illustrated exemplary embodiments of the invention.

Apparatus according to some aspects of the invention have subsets of the features described above. For example, the invention provides:

apparatus having a fine separation stage having some or all of the features described above;

apparatus having a polishing stage housing some or all of the features described above;

apparatus having a plates pack oriented as described herein; and, so on.

The invention encompasses apparatus and methods comprising any novel and inventive features; novel and inventive combinations of features or novel and inventive sub-combinations of features described herein.

As will be apparent to those skilled in the art in the light of the foregoing disclosure, many alterations and modifications are possible in the practice of this invention without departing from the spirit or scope thereof. For example, FIG. 2 shows a plates pack 30 inclined at an angle of 60° to the horizontal. This angle does not need to be exactly 60° but could be any angle in a suitable range around 60°. The range may begin, for example, at 45°, 50°, 55° or 59° and may extend, for example, to 61°, 65°, 70° or 75°.

Accordingly, the scope of the invention is to be construed in accordance with the substance defined by the following claims.

What is claimed is:

1. An apparatus for separating a mixture of a less dense fluid, a more dense fluid, and fines, the less and more dense fluids being immiscible with each other, the apparatus comprising:

a housing having an inlet at an upstream end thereof and an outlet at a downstream end thereof;

a separation chamber located within the housing between the inlet and the outlet, the separation chamber comprising:

a generally horizontal enclosure; and, a screw defining a helical passage through the enclosure, the separation chamber having at least one upper aperture located in an upper portion of the helical passage and at least one lower aperture located in a lower portion of the helical passage; and, a baffle attached between the housing and the separation chamber for directing at least a portion of the mixture into the separation chamber, whereby as the mixture is directed through the helical passage at least a portion of the less dense fluid passes through the at least one upper aperture into an upper collection zone in the housing, and at least a portion of the fines passes through the at least one lower aperture into a lower collection zone in the housing.

2. An apparatus according to claim 1 comprising a distribution chamber coupled to the inlet, the distribution chamber comprising a coalescing plates pack for directing at least a portion of the less dense fluid to the upper collection zone and at least a portion of the fines to the lower collection zone.

3. An apparatus according to claim 2 wherein the coalescing plates pack comprises a plurality of corrugated plates inclined at an angle in the range of 45 to 75 degrees to the horizontal, with their corrugations oriented so as to cross a direction of flow through the coalescing plates pack.

4. An apparatus according to claim 2 wherein the distribution chamber has a cross-sectional area greater than a cross-sectional area of the inlet, such that a velocity of the mixture is reduced as the mixture passes from the inlet to the distribution chamber.

5. An apparatus according to claim 1 wherein the separation chamber comprises a coalescing chamber in fluid communication with the helical passage and located at a downstream end thereof, the coalescing chamber containing a plurality of beads which attract small droplets of the less dense fluid and form larger droplets of the less dense fluid.

6. An apparatus according to claim 5 wherein the coalescing chamber comprises a perforated plate at each of an upstream and a downstream end thereof, the perforated plates having perforations sized to retain the beads in the coalescing chamber and allow the mixture to pass therethrough.

7. An apparatus according to claim 6 wherein the separation chamber comprises a second screw located downstream of the coalescing chamber defining a second helical passage, the separation chamber having at least one second upper aperture located in an upper portion of the second helical passage and at least one second lower aperture located in a lower portion of the second helical passage.

8. An apparatus according to claim 7 wherein the separation chamber comprises a second coalescing chamber in fluid communication with the second helical passage and located at a downstream end thereof, the second coalescing chamber containing a plurality of beads which attract small droplets of the less dense fluid and form larger droplets of the less dense fluid.

9. An apparatus according to claim 8 wherein the second coalescing chamber comprises a perforated plate at each of an upstream and a downstream end thereof, the perforated plates having perforations sized to retain the beads in the second coalescing chamber and allow the mixture to pass therethrough.

10. An apparatus according to claim 1 comprising a heater located in the housing.

11. An apparatus according to claim 10 wherein the heater comprises a helical heating coil positioned around the separation chamber.

12. An apparatus according to claim 1 wherein the generally horizontal enclosure comprises a cylinder.

13. An apparatus according to claim 1 comprising a conduit located in an upper portion of the housing for removing the less dense fluid from the upper collection zone.

14. An apparatus according to claim 1 comprising a fines outlet conduit located in a lower portion of the housing for removing the fines from the lower collection zone.

15. An apparatus according to claim 1 comprising a gas collection cylinder attached to a top of the housing for collecting gas introduced into the housing along with the mixture.

16. An apparatus according to claim 15 comprising a gas outlet conduit located in an upper portion of the gas collection cylinder for removing gas from the gas collection cylinder.

17. An apparatus according to claim 1 comprising a polishing chamber defined by between a downstream end plate of the housing and a baffle attached to a downstream end of the separation chamber.

18. An apparatus according to claim 17 wherein the downstream end plate of the housing comprises an aperture therein sized to allow the separation chamber to be removed from the housing, the apparatus comprising a lid removably attached to the downstream end plate for covering the aperture therein, wherein the outlet is located on the lid.

19. An apparatus according to claim 18 wherein the polishing chamber comprises a polishing device coupled to the inside of the lid, the polishing device comprising:

a polishing cylinder having an aperture in a lower portion thereof for admitting the mixture into the polishing device;

a first coalescing zone in the polishing cylinder having fine beads therein, the first coalescing zone defined between a first perforated plate located adjacent to the aperture of the polishing cylinder and a second perforated plate located above the first perforated plate;

a second coalescing zone in the polishing cylinder having coarse beads therein, the second coalescing zone defined between the second perforated plate and a third perforated plate located above the second perforated plate;

a less dense fluid collecting zone defined between the third perforated plate and an upper wall of the polishing cylinder;

a less dense fluid evacuation conduit for removing the less dense fluid from the less dense fluid collecting zone; and, a plate extending downwardly and outwardly from the lid for directing the more dense fluid away from the less dense fluid evacuation conduit and toward the outlet.

* * * * *